United States Patent [19]
Nishikawa

[11] Patent Number: 5,355,507
[45] Date of Patent: Oct. 11, 1994

[54] COMPUTER SYSTEM FOR ARBITRATING THE OPERATION OF A BUILT-IN MODEM AND EXTERNAL SIO CIRCUIT

[75] Inventor: Hirofumi Nishikawa, Tokyo, Japan

[73] Assignee: Kabushiki Kaisha Toshiba, Kawasaki, Japan

[21] Appl. No.: 784,713

[22] Filed: Oct. 30, 1991

[30] Foreign Application Priority Data

Nov. 7, 1990 [JP] Japan .................. 2-301693

[51] Int. Cl.5 ................................ G06F 1/00
[52] U.S. Cl. .................. 395/800; 364/222.2; 364/238.5; 364/238.2; 364/DIG. 1
[58] Field of Search ............ 395/800, 250, 400; 370/94.1, 60; 375/8

[56] References Cited

U.S. PATENT DOCUMENTS 4,987,588  1/1991  Fukuma et al. .................. 379/98
5,162,675  11/1992  Olsen et al. .................... 307/465

Primary Examiner—Alyssa H. Bowler
Assistant Examiner—John Harrity
Attorney, Agent, or Firm—Oblon, Spivak, McClelland, Maier & Neustadt

[57] ABSTRACT

A computer system having a system body, a CPU, a modem control register, a built-in modem board, and an extended unit. When both the modem board and the extended unit are connected to the system body, the CPU determines whether the base address of the modem board is also the same as the base address of the extended unit. If same base address is used, the CPU sets hardware control data into the modem control register, which disables the modem board, whereby the modem board is disabled.

10 Claims, 5 Drawing Sheets

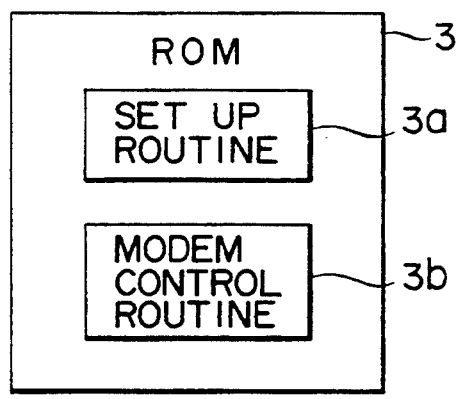
F I G. 2
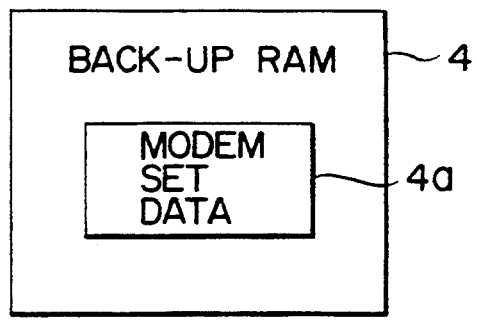
F I G. 3

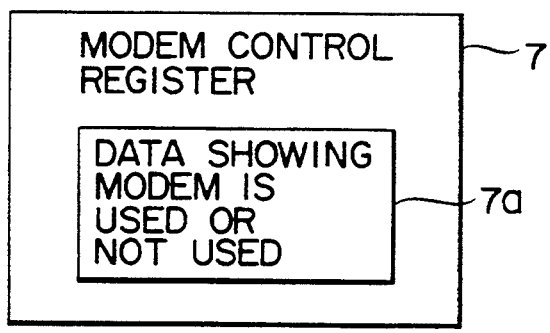
F I G. 4
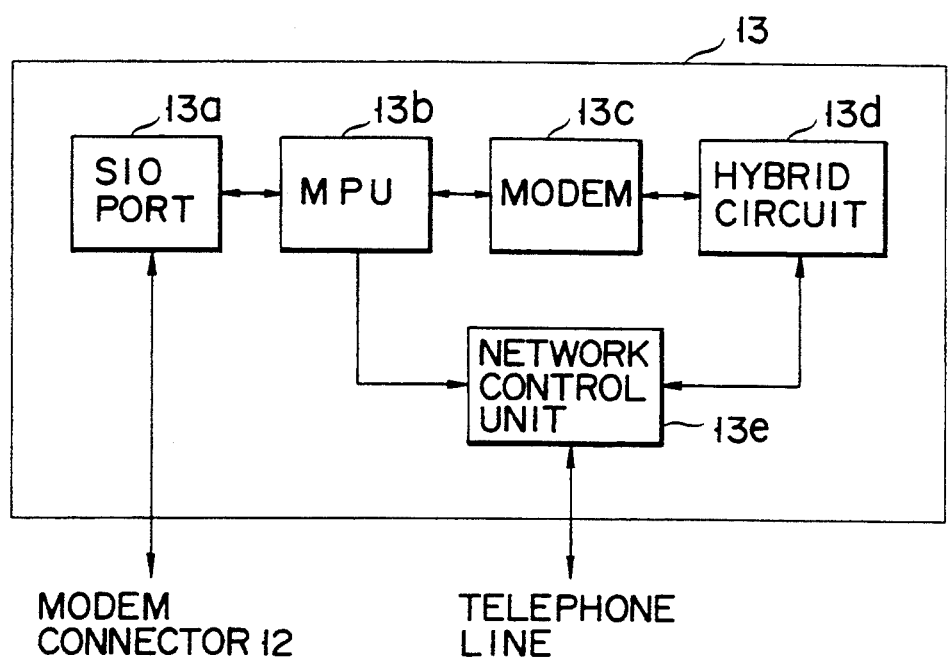
F I G. 5

COMPUTER SYSTEM FOR ARBITRATING THE OPERATION OF A BUILT-IN MODEM AND EXTERNAL SIO CIRCUIT

BACKGROUND OF THE INVENTION

1. Field of the Invention

The present invention relates to a computer system to which an extended unit can be connected and which has a modem board used as communication unit.

2. Description of the Related Art

In the field of personal computers, so-called laptop computers, which are small, light and portable, are used in increasing number. A laptop computer comprises a system body and standard peripheral units located within the system body, such as a keyboard, a liquid-crystal display, and a floppy disk drive. It is most desirable that a laptop computer be as small as possible. It is therefore preferable that as less input-output devices as possible be incorporated in the system body. This is why a communication unit, which enables the computer to exchange data with other computers, is not located within the system body in most cases. Rather, the communication unit is located outside the system body and electrically connected to the system body.

Lap-top computers have been developed, to which extended units (i.e., peripheral units other than the standard ones) can be connected. Each of the extended units has an extension board having a printer port, various serial I/O ports, and the like. The extension board of each extended unit is connected to the system body of the computer.

Further, laptop computers have been developed, to which extended units can be connected and which have a modem board built in the system body. Once any extended unit is connected to the computer, it becomes possible to utilize the various functions of the board built in the extended unit. Of course, the computer can receive data from, and transmit data to, any other computer, by means of the modem board built in its system body. The modem board is controlled, independently of the extended unit connected to the computer. In other words, the modem board is controlled, no matter whether or not the extended unit is connected to the computer. Hence, when a base address (I/O address) is set for the serial port of the modem board, with the extended unit connected to the computer, it may be identical to the base address set for the serial port of the extended unit. If this happens, neither the built-in modem board nor the extended unit can be used at all.

SUMMARY OF THE INVENTION

The object of the present invention is to provide a computer system to which an extended unit can be connected, which has a modem board used as communication unit, and in which both the extended unit and the modem board can be used, with the extended unit connected to the computer system.

According to the invention, there is provided a computer system which has a build-in modem board and to which an extended unit can be connected, said system further comprising:

modem control register means for storing modem-controlling data for controlling the modem board having a serial port which can be accessed in accordance with a base address present for the modem board;

connecting means for connecting the extended unit to the computer system having a serial port which can be accessed in accordance with a base address present for the extended unit; and control means for determining whether or not the base address of the modem board is used also for the extended unit, and loading the modem-controlling data into said modem control register means when the base address of the modem board is used for the extended unit, thereby disabling the function of the modem board.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a block diagram explaining the items of data stored in the ROM incorporated in the computer system;

FIG. 3 is a diagram representing the items of data stored in the backup ROM built in the computer system;

FIG. 4 is also a diagram illustrating the items of data stored in the backup RAM incorporated in the computer system;

FIG. 5 is a block diagram showing the modem board built in the computer system;

DETAILED DESCRIPTION OF THE PREFERRED EMBODIMENT

An embodiment of the present invention will now be described in detail, with reference to the accompanying drawings.

Figure 1:
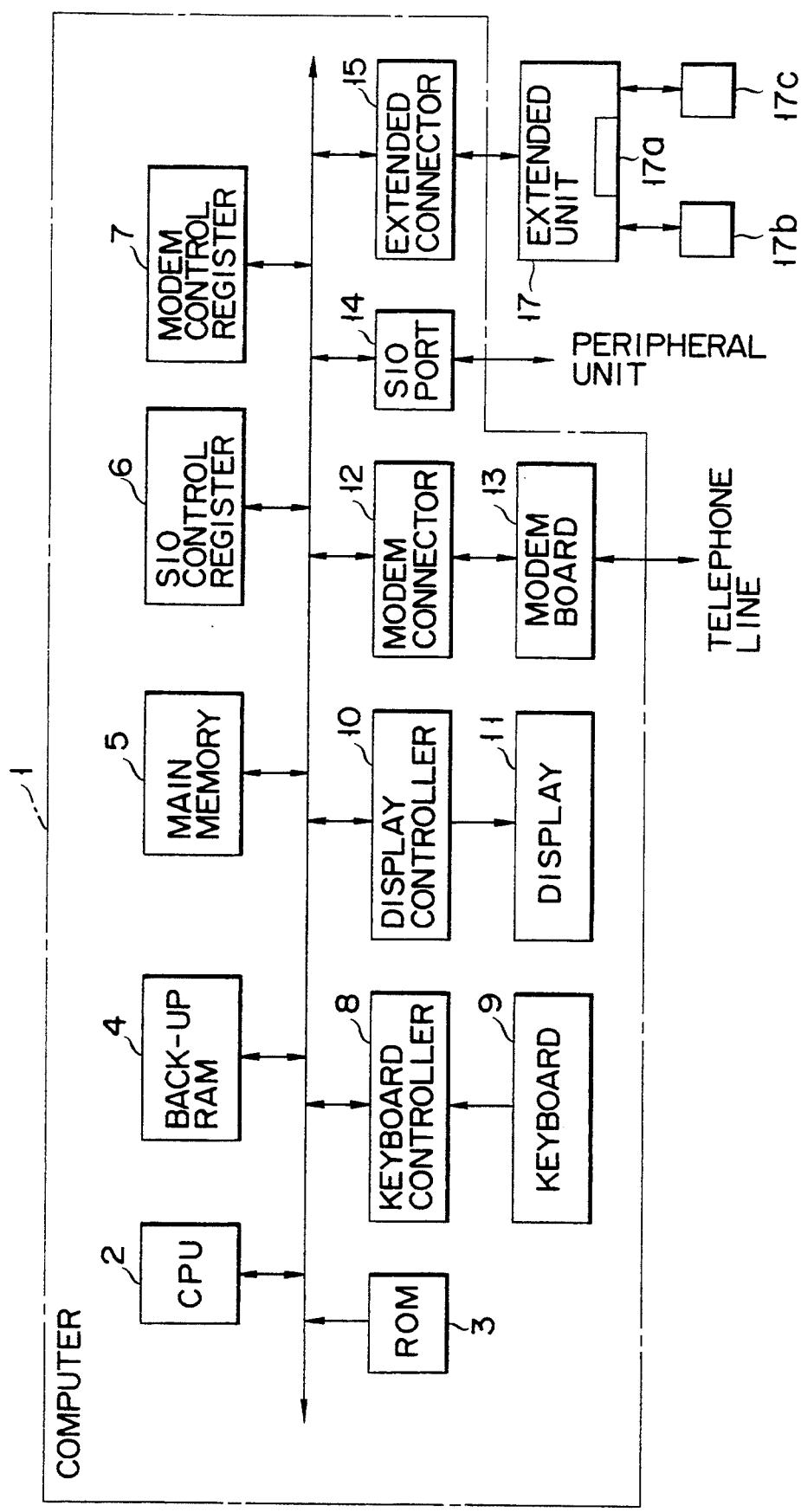
FIG. 1 is a block diagram showing a computer system according to the present invention.

FIG. 1 schematically shows the embodiment of the invention, which is a laptop personal computer. This computer comprises a system body 1. As is shown in FIG. 1, the system body 1 contains a CPU (Central Processing Unit) 2, a ROM (Read-Only Memory) 3, a backup RAM (Random-Access Memory) 4, a main memory 5, a serial I/O control register 6, a modem control register 7, and a modem board 13.

The CPU 2 controls the other components incorporated in the system body 1, in accordance with the programs stored in the ROM 3 and the main memory 5. The ROM 3 stores system control programs, more precisely setup routine 3a and backup routine 3b, as is shown in FIG. 2.

The backup RAM 4 is a read/write memory which is backed up by a battery (not shown) located within the system body 1. This RAM 4 stores modem set data 4a, as is shown in FIG. 3. The modem set data 4a consists of data item representing whether or not the user has enabled the modem board 13, the data item showing the base address of the serial port of the modem board 13, the data item showing an interruption level, the data item representing whether or not the user has enabled a power supply for the modem board 13, and similar data items—all to be displayed in the setup screen in accordance with the setup routine 3a.

The main memory 5 stores various programs the CPU 2 requires to process data, and also the data processed and to be processed by the CPU 2. The serial I/O control register 6 is used to store various control data items including a data item showing whether or not the SIO (Serial input-output) port 14, located in the system body 1, has been enabled.

The modem control register 7 is used to store the hardware information of the modem board 13. As is shown in FIG. 4, the hardware information includes a data item 7a representing whether the modem board 13 is used or not. It further includes a data item controlling the base address of the serial port of the modem board 13, a data item controlling the interruption level of the modem board 13, and a data item controlling the state (enabled or disabled state) of the power supply for the modem board 13.

As is evident from FIG. 1, the computer system further comprises a keyboard controller 8, a keyboard 9, a display controller 10, a display 11, a modem connector 12, and an extended connector 15.

The keyboard controller 8 receives commands and data input by operating the keyboard 9 and supplies them to the CPU 2 through the system bus 16 incorporated in the system body 1. The display controller 10 outputs image data items under the control of the CPU 2. The display 11 is, for example, a CRT display for displaying a setup menu.

The modem connector 12 connects the modem board 13 to the system bus 16, whereby the modem board 13 is connected to some other components incorporated in the system body 1. The modem board 13 is an optional device which can be detached from the system body 1. As is shown in FIG. 5, the board 13 comprises, besides the SIO port 13a, a microprocessor (MPU) 13b, a modem 13c, a hybrid circuit 13d, and a network control unit (NCU) 13e. The SIO port 13a converts the parallel data supplied via the modem connector 12, such as a modem control command and received data, into serial data, and supplies the serial data to the MPU 13b. The SIO port 13a converts the serial data into parallel data, and supplies the parallel data to some components located within the system body 1 through the modem connector 15.

The MPU 13b decodes the modem control command supplied from the SIO port 13a, generating a result code. The MPU 13b outputs the result code to the SIO port 13a. The computer system can be in on-line state, wherein the modem board 13 is connected to a telephone, which in turn is connected to any other computer system, so that data can be exchanged between the two computer systems. When the system of FIG. 1 is in the on-line state, the MPU 13b conveys data from the SIO port 13a to the modem 13c so that the computer system may transmit the data, and also conveys data from the modem 13c to the SIO port 13a so that the computer system may receive the data.

The modem 13c is an LSI designed exclusively to modulate the data supplied from the MPU 13b and demodulate the data received via the telephone line. The hybrid circuit 13d conveys analog signals from the modem 13c to the NCU 13e, whereby the analog signals are transmitted through the telephone line. The hybrid circuit 13d also conveys the received analog signals from the NCU 13e to the modem 13c. The NCU 13e is connected, at one end, to the hybrid circuit 13d and, at the other end, to the telephone line, for controlling the receipt and transmission of analog signals.

The SIO port 14 functions as interface for connecting various peripheral units (not shown) to the system body 1. The extended connector 15 is provided for connecting an extended (optional) unit 17 to the system body 1. More specifically, the unit 17 has an extended board connector 17a, an SIO port 17b and a printer port 17c, which can connect peripheral units to the system body 1.

Figure 6:
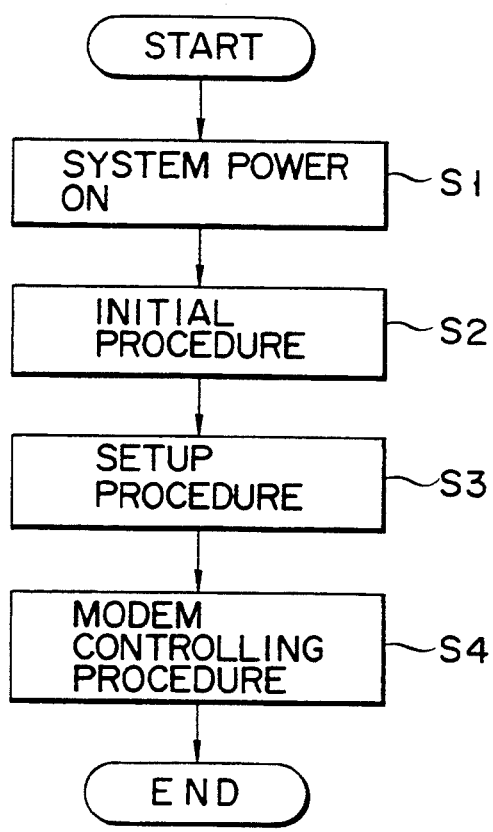
FIG. 6 is a flow chart explaining an operation the computer system performs.
Figure 7:
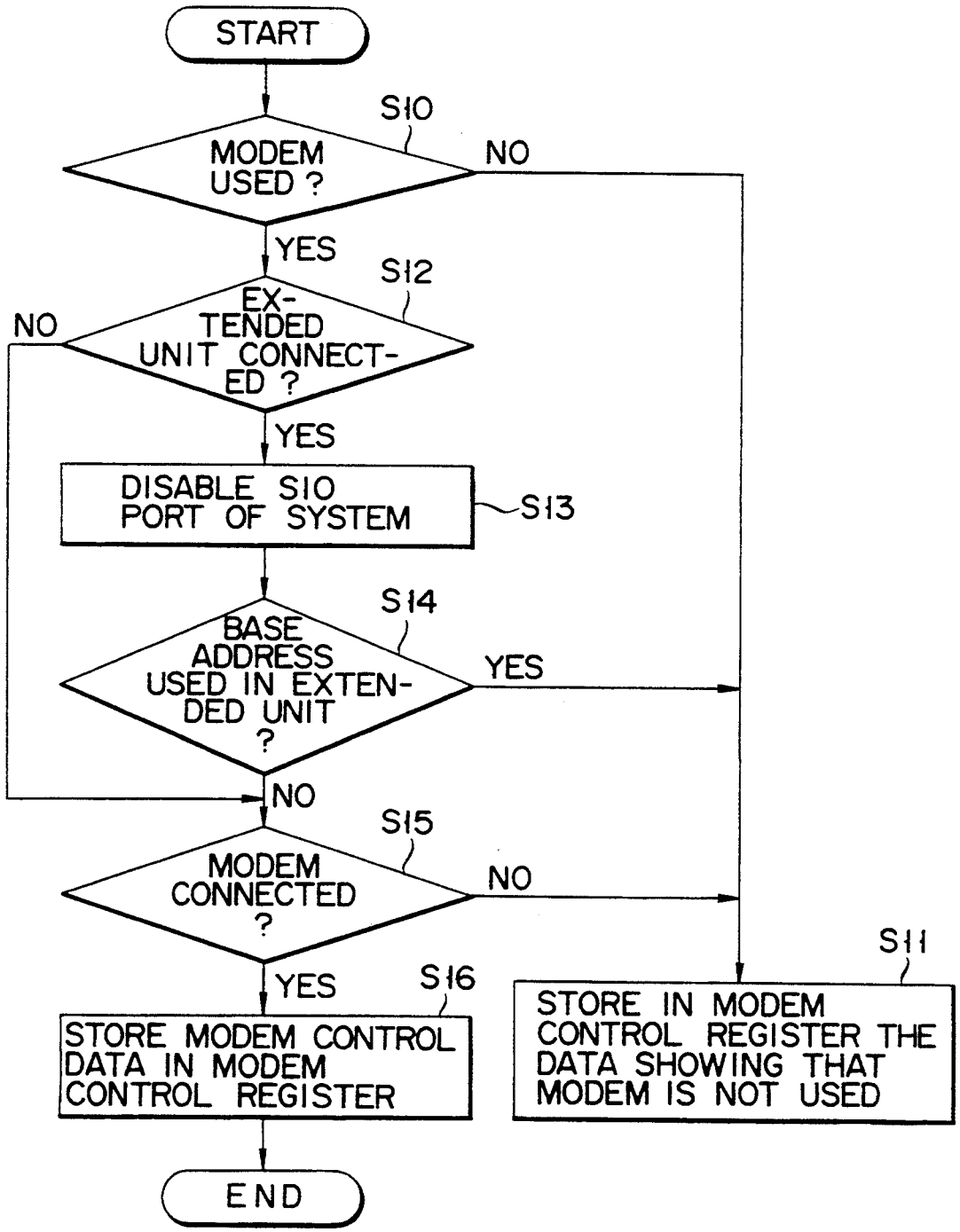
FIG. 7 is also a flow chart explaining another operation the computer system performs.

With reference to the flow charts of FIGS. 6 and 7, it will now be explained how the computer system of FIG. 1 perform its function. As is shown in FIG. 6, the power switch of the system is turned on in step S1. Then, in step S2, the CPU 2 initializes the other components of the computer system. Next, in step S3, the CPU 2 makes an access to the setup routine 3a stored in the ROM 3, thereby setting up the modem board 13. More precisely, the CPU 2 controls the display controller 10, which in turn controls the display 11, whereby the display 11 displays a setup menu. The setup menu includes various data items, such as "MODEM VALID/INVALID," "BASE ADDRESS OF MODEM PORT," "INTERRUPTION LEVEL," and "MODEM POWER SUPPLY VALID/INVALID." Seeing these data items displayed on the display 11, the user operates the keyboard 9, thereby enabling or disabling the modem board 13, setting an appropriate base address for the serial port of the board 13, setting a desired interruption level for the board 13, and enabling or disabling the power supply for the board 13. Then, the modem set data 4a, i.e., the data items input by operating the keyboard 9, are stored into the backup RAM 4.

Next, in step S4, the CPU 2 accesses the modem control routine 3b stored in the ROM 3, and controls the modem board 13 in accordance with the control routine 3b, as will be explained with reference to FIG. 7.

First, in step S10, the CPU 2 makes an access to the backup RAM 4. From the modem set data 4a the CPU 2 determines whether or not the modem board 13 is enabled or not. If NO in step S10, the flow goes to step S11. In step S11, the CPU 2 sets the hardware control data in the modem control register 7, which represents that the modem board 13 is disabled. Hence, even if an interrupt to the modem board 13 is made, the board 13 remains disabled. As long as the modem board 13 is disabled, no base address, which is identical to that set for the SIO port 13a of the board 13, can be set for the serial port of the extended unit 17. Hence, the extended unit 17 performs its function reliably.

If YES in step S10, that is, if the modem board 13 is enabled, the CPU 2 determines, in step S12, whether or not the extended unit 17 is connected to the system body 1 by means of the extended connector 15. More specifically, the CPU 2 determines that the unit 17 is connected to the system body 1 when it receives an ID signal from the circuit incorporated in the extended unit 17, and that the unit 17 is not connected to the system body 1 when it does not receive the ID signal. It should be noted that the circuit included in the unit 17 outputs the ID signal to the CPU 2 via the extended connector 15 and the system bus 16 when the extended unit 17 is connected to the system body 1 by the connector 15.

If YES in step S12, that is, if the extended unit 17 is connected to the system body 1, the CPU 2 disables all SIO ports provided within the system body 1, in step S13. Also in step S13, the CPU 2 sets control data in the SIO control register 6, which represents that the SIO port 14 has been disabled.

Then, in step S14, the CPU 2 determines whether or not the base address of the SIO port 13a of the modem board 13 is used as base address of the SIO port 17b of the extended unit 17. More precisely, the CPU 2 tries to access the SIO port 17b in accordance with the base address of the SIO part 13a, and determines that the base address of the SIO port 13a is used so, if the SIO port 17b is accessed successfully.

If YES in step S14, that is, the base address of the SIO port 13a is used in the extended unit 17, the flow goes to step S11. In step S11, the CPU 2 disables the modem board 13 and sets hardware control data in the modem control register 7, which shows that the modem board 13 is disabled.

If NO in step S14, that is, the base address of the SIO port 13a is not used in the extended unit 17, the flow goes to step S15. In step S15, the CPU 2 determines whether or not the modem board 13 is connected to the modem connector 12. More precisely, the CPU 2 tries to access the SIO port 13a of the board 13 in accordance with the base address of the SIO port 13a, and determines that the board 13 is functioning well, if the SIO port 13a is accessed.

If YES in step S15, that is, the modem board 13 functions well and, hence, the board 13 is connected to the modem connector 12, the flow goes to step S16. In step S16, the CPU 2 sets hardware control data in the modem control register 7, which accords with the modem set data 4a stored in the backup RAM 4. In other words, hardware control data items are set in the modem control register 7. These hardware control data items include the item showing that the modem board 13 is enabled, the item controlling the base address of the SIO port 13a, the item controlling the interruption level of the board 13, and the item controlling the power supply for the modem board 13.

If NO in step S15, that is, if the modem board 13 is not connected to the modem connector 12, the flow goes to step S11, in which the CPU 2 disables the modem board 13 and sets hardware control data in the modem control register 7, which shows that the board 13 is disabled.

In NO in step S12, that is, the extended unit 17 is not connected to the system body 1, the flow jumps to step S15, and then to step S11 or step S16.

As has been described, the hardware data representing that the modem board 13 is disabled is set in the modem control register 7 if the base address preset for the board 13 is used also in the extended unit 17, while both the modem board 13 and the extended unit 17 are connected to the system body 1. Hence, the modem board 13 is disabled and cannot perform its function.

Even if both the board 13 and the unit 17 are connected to the system body 1, they can operate independently, provided that the base address preset for the modem board 13 is not used in the extended unit 17. In this case, the modem board 13 incorporated in the system body 1 performs its function in accordance with the hardware control data set in the modem control register 7.

Thus, the base addresses of the modem board 13 and the extended unit 17 happen to be identical. Both the board 13 and the unit 17 will not cease to function, and at least the extended unit 17 can function at any time.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A computer system having modem-controlling function, said computer system comprising:
 a modem board disposed in a system body of said computer system and having a serial input-output port which is to be accessed in accordance with a preset first base address;
 modem control register means for storing modem control data for controlling said modem board;
 detachable extended unit means having serial input-output ports which are to be accessed in accordance with a preset second base address and which are designed to externally connect various extended units to the system body of the computer system;
 first control means for determining whether or not the first base address of said modem board is the same as the second based address of said extended unit means, and for setting modem control data in said modem control register means, which disables said modem board, when the first base address of said modem board is the same as the second base address of said extended unit means; and
 second control means for controlling said modem board in accordance with the modem control data set in said modem control register means.

2. A computer system according to claim 1, wherein said modem control data comprises a data item enabling or disabling said modem board and a data item controlling the first base address preset for the input-output port of said modem board.

3. A computer system according to claim 1, wherein said extended unit means further has connector means for connecting an extended unit to the computer system.

4. A computer system according to claim 1, further comprising first memory means storing modem control routine, wherein said first control means comprises a CPU for executing the modem control routine, thereby to initialize the computer system.

5. A computer system according to claim 1, further comprising second memory means for storing modem control data when the computer system is set up, wherein said first control means sets the modem control data stored in the second memory means into said modem control register means when the first base address of said modem board is not the same as the second base address of said extended unit means.

6. A computer system according to claim 5, wherein said first control means comprises means for determining whether or not said modem board is connected to the computer system when said extended unit means is not connected to the computer system, setting the modem control data, which is stored in said second memory means, into said modem control register means when said modem board is connected to the computer system, and setting the modem control data, which disables said modem board into said modem control register means when said modem board is not connected to the computer system.

7. A computer system according to claim 5, wherein said first control means sets the modem control data, which disables said modem board, into said modem control register means when modem control data, which represents that said modem board need not be used, is set into said second memory means when the computer system is set up.

8. A computer system according to claim 5, wherein said first control means comprises means for determining whether or not said modem board is connected to the computer system, when the modem control data, which represents that said modem board need be used, is set into said second memory means when the computer system is set up.

9. A computer system according to claim 5, wherein said first control means comprises means for disabling a serial input-output port, which is connected to an external peripheral unit, when said extended unit means is connected to the computer system.

10. A computer system according to claim 5, wherein said first control means comprises means for determining whether or not said modem board is connected to the computer system, when the first base address of said modem board is not the same as the second base address of said extended unit means.

* * * * *